United States Patent
Hadley

(10) Patent No.: US 6,766,463 B1
(45) Date of Patent: Jul. 20, 2004

(54) METHOD AND APPARATUS FOR CONTROLLING AND NORMALIZING THE DESIRED RATE OF A VISUAL PROCESS ACROSS DIFFERENT COMPUTING PLATFORMS AND ENVIRONMENTS

(75) Inventor: Andrew Hadley, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 578 days.

(21) Appl. No.: 09/639,534

(22) Filed: Aug. 16, 2000

(51) Int. Cl.⁷ .............................................. G06F 1/12
(52) U.S. Cl. ...................................... 713/503; 713/502
(58) Field of Search ............................... 713/500, 502, 713/503; 345/1.1, 130, 418

(56) References Cited

U.S. PATENT DOCUMENTS

| | | | | |
|---|---|---|---|---|
| 6,097,399 A | * | 8/2000 | Bhatt et al. | 345/440 |
| 6,181,300 B1 | * | 1/2001 | Poon et al. | 345/698 |
| 6,417,855 B1 | * | 7/2002 | Yonts | 345/473 |
| 6,442,509 B1 | * | 8/2002 | Kokko | 702/187 |

FOREIGN PATENT DOCUMENTS

JP          11282819 A   * 10/1999   .........  G06F/15/177

OTHER PUBLICATIONS

"Setting Viewability of Information in a Virtual World", IBM Technical Disclosure Bulletin, Mar. 1, 1997, US, pp. 217–218.*

* cited by examiner

Primary Examiner—Thomas Lee
Assistant Examiner—Paul Yanchus, III
(74) Attorney, Agent, or Firm—Suiter West PC LLO

(57) ABSTRACT

A method and system for controlling and normalizing a rate of a process is described. A hidden process is executed a predetermined number of times as a loop value, and a visual process is executed to complete a cycle. The time to complete a cycle is measured, and an updated loop value is calculated. In a subsequent cycle, the hidden process is executed a number of times equal to the updated loop value so that the visual process is executed at a desired rate normalized across all computing platforms, configuration, and performance environments. It is emphasized that this abstract is provided to comply with the rules requiring an abstract that will allow a searcher or other researcher to quickly ascertain the subject matter of the technical disclosure. It is submitted with the understanding that it will not be used to interpret or limit the scope or meaning of the claims. 37 CFR 1.72(b).

24 Claims, 3 Drawing Sheets

METHOD AND APPARATUS FOR CONTROLLING AND NORMALIZING THE DESIRED RATE OF A VISUAL PROCESS ACROSS DIFFERENT COMPUTING PLATFORMS AND ENVIRONMENTS

BACKGROUND

Processes typically tend to run at different speeds on different machines due to the differences in performance between varying computer platforms and configurations. Often, a program that is running too fast may be as useless as a program that is running too slowly, especially when the process displays information that is continually updated and must be interpreted by a user, for example the real-time display of data. Thus, there lies a need for a method and system that allows a program to optimize its speed accordingly so that performance is normalized across multiple computer platforms.

SUMMARY

The present invention is directed to a method and system that allows a process to appear to be running at a normalized speed independent of the computer platform, configuration, and processor or bus speed. A hidden process gathers and processes data in a manner that is normally not visible to the user. A visual process displays the results of the hidden process in a way that is visible or detectable by a user. An optimal rate for which the visible process is desired to be updated is determined. The hidden process is executed a predetermined number of times, and the visible process is executed once to complete a cycle. The time required to complete the cycle is determined, and an updated value for the number of times to execute the hidden process is calculated. The hidden process is executed a number of times equal to the updated value in a subsequent cycle. The method continues so that the visual process is executed at a normalized interval based upon the number of times that the hidden process executes per refresh, which in turn is a function of the platform speed.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiment of the invention, an example of which is illustrated in the accompanying drawings.

Figure 1:
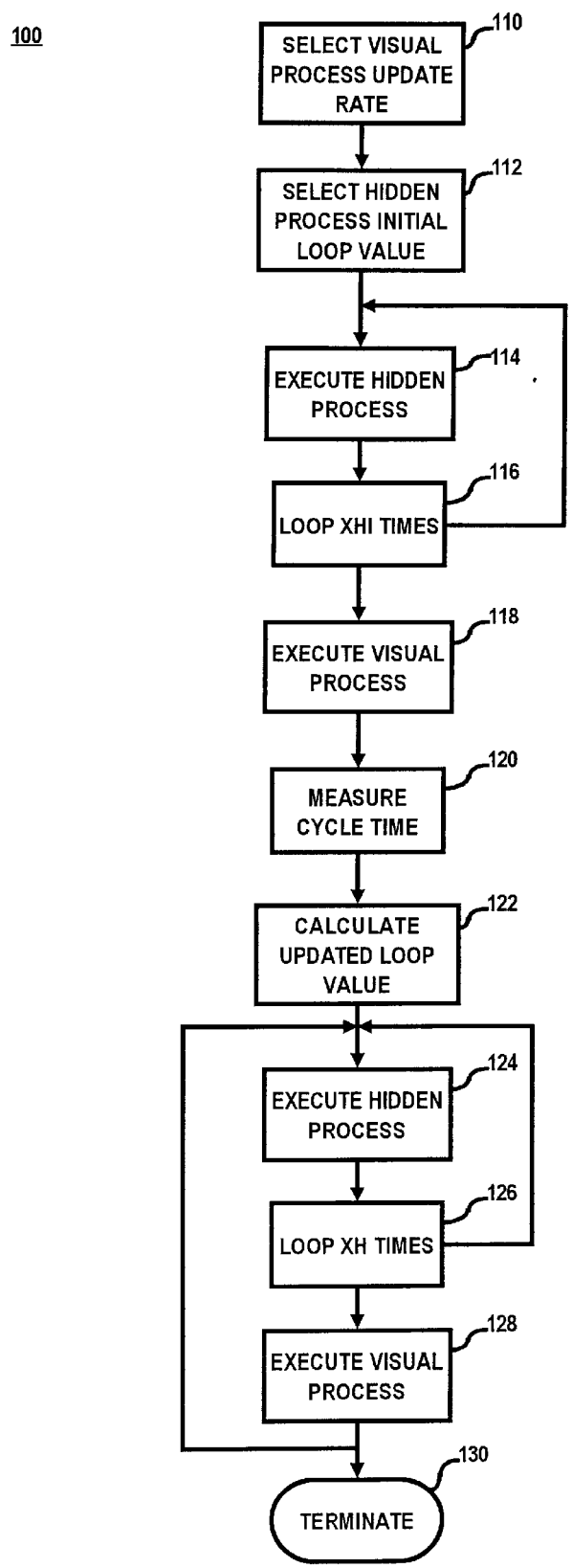
FIG. 1 is a flow diagram of a method for normalizing the speed of a process in accordance with the present invention.

Referring now to FIG. 1, a flow diagram of a method for normalizing the speed of a process in accordance with the present invention will be discussed. Method 100 is executed by a set of instructions for implementing a process designed to operate on several computer platforms and systems having differing configurations, operational speeds, and performance environments. The process may be categorized into two sub processes, the first being a hidden process and the second being a visual process. The hidden process is typically executed without being noticeable or directly apparent or visible to the user. Such hidden processes are typically calculations or instructions that occur in a manner not readily apparent to the user, whereas a visual process is typically readily aparent and is directly noticeable and interpretable by the user. For example, a hidden process may be the execution of a mathematical formula based upon input data, whereas the visual process may be the displaying of the results of the hidden process on a display, such as the mathematical result. It should be appreciated that a visual process need not be limited to that detectable with the sight of a user, but may also include processes that are detectable by other sensory systems of the user, e.g., auditory, tactile, etc. such that any sense of a user is encompassed within the definition of visual. As hidden processes and visual processes are executed, the time to execute a complete cycle of both a hidden process and a visual process will vary with the computer platform and hardware configuration in addition to the complexity and the number of steps in each of the processes. Method 100 is utilized to normalize the execution of the visual process so that the visual process is executed at an optimal, controlled and normalized rate for all platforms and configurations, and also with other environmental factors such as processor loading where multiple processes or threads are executed simultaneously, for example multitasking.

Method 100 is initially executed with step 110 at which the desired visual process rate or update rate is selected. The visual process update rate, f, is selected by the programmer in one embodiment, or is selectable by a user in another embodiment. For example, it may be desired that the visual process executes at a frequency of 0.2 hertz (updated every five seconds). An initial value for the hidden process initial loop value, Xhi, is selected at step 112. The initial loop value may be an arbitrary number, or a predetermined number selected by a programmer based upon an initial value, for example a value determined to fall in a range wherein values in the range typically allow method 100 to result in an optimum value for a successive cycle iteration. The hidden process is executed at step 114, and looped at step 116 so that step 114 is executed a number of times equal to the initial loop value. After Xhi iterations of the hidden process, the visual process is executed at step 118 upon which event one cycle is completed. The cycle time, t, is measured at step 120, for example in seconds. At this point, an updated loop value, Xh, may be calculated at step 122 according to the following equation:

$$X_h = X_{hi}/(t*f)$$

Thus, the updated loop value, Xh, is calculated as the initial loop value, Xhi, divided by the product of the cycle time, t, and the desired visual process rate, f The updated loop value accounts for the cycle time required to execute the hidden process and the visual process so that the time required to execute the hidden loop using the updated loop value will cause the effective visual process rate to be equal to, or at least approximately equal to, the desired visual process update rate. After calculation of the updated loop value, for the subsequent cycle, the hidden process may be executed at step 124 and iterated a number of times equal to the updated loop value such that loop step 126 is executed Xh times. Thus, in the subsequent cycle, the number of hidden process loop iterations is adjusted to cause the visual process to occur at the desired visual process rate. The process continues by executing the visual process at step 128, and then continues to execute steps 124, 126, and 128 using the updated hidden process loop value until process 100 terminates at step 130.

Figure 2:
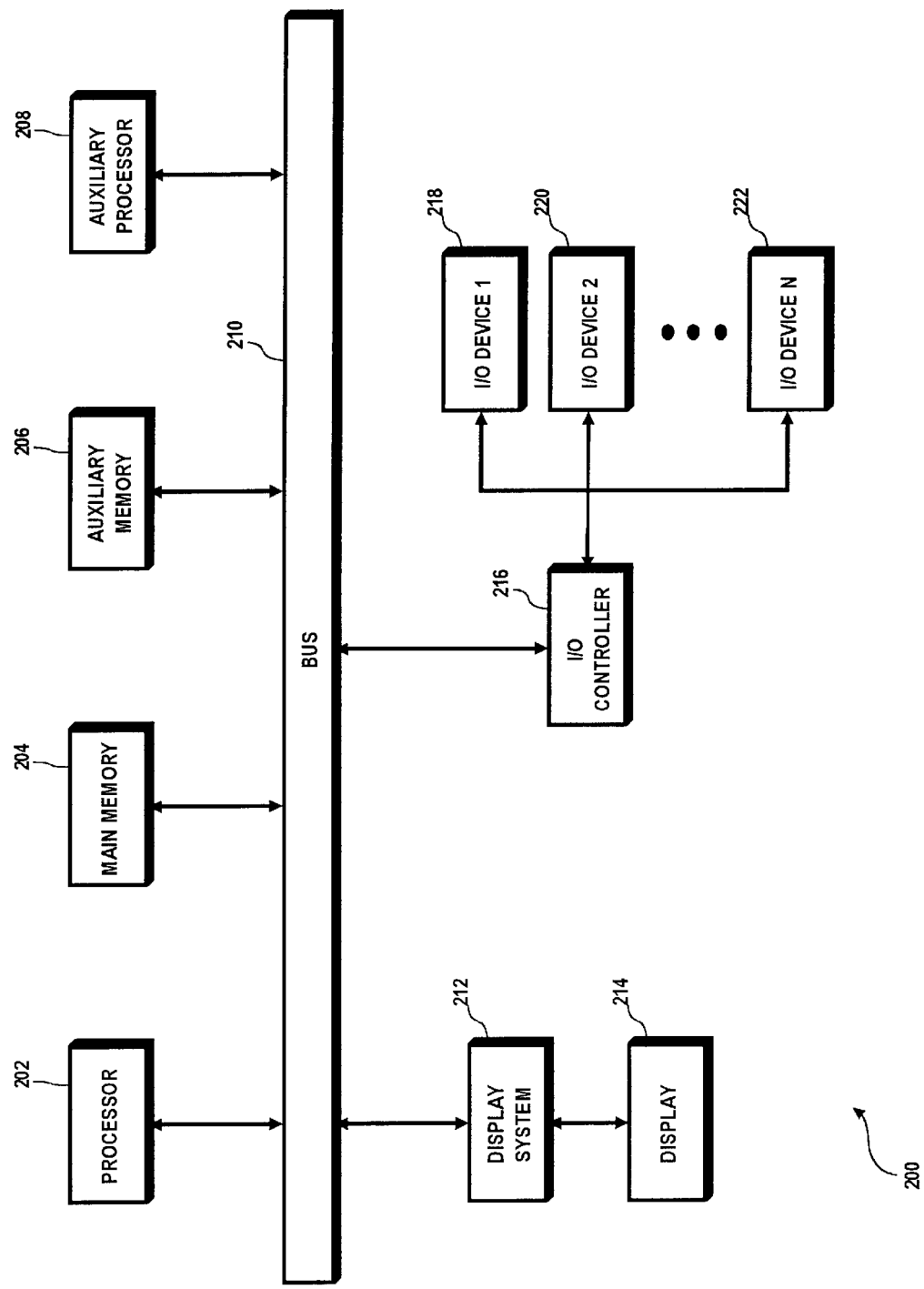
FIG. 2 is a block diagram of a computer system operable to embody the present invention.

Referring now to FIG. 2, a hardware system in accordance with the present invention is shown. The hardware system shown in FIG. 2 is generally representative of the hardware architecture of a computer system embodiment of the present invention. Computer system 200 may be configured to implement method 100 of FIG. 1, for example, by executing method 100 as a set of instructions. A central processor 202 controls the computer system 200. Central processor 202 includes a central processing unit such as a microprocessor or microcontroller for executing programs, performing data manipulations and controlling the tasks of computer system 200. Communication with central processor 202 is implemented through a system bus 210 for transferring information among the components of computer system 200. Bus 210 may include a data channel for facilitating information transfer between storage and other peripheral components of computer system 200. Bus 210 further provides the set of signals required for communication with central processor 202 including a data bus, address bus, and control bus. Bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 210 may be compliant with any promulgated industry standard. For example, bus 210 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of computer system 200 include main memory 204, auxiliary memory 206, and an auxiliary processor 208 as required. Main memory 204 provides storage of instructions and data for programs executing on central processor 202. Main memory 204 is typically semiconductor based memory such as dynamic random access memory (DRAM) and or static random access memory (SRAM). Auxiliary memory 206 provides storage of instructions and data that are loaded into the main memory 204 before execution. Auxiliary memory 206 may include semiconductor-based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 206 may also include a variety of non-semiconductor based memories, including but not limited to magnetic tape, drum, floppy disk, hard disk, optical, laser disk, compact disc read-only memory (CD-ROM), digital versatile disk read-only memory (DVDROM), digital versatile disk random-access memory (DVD-RAM), etc. Other varieties of memory devices are contemplated as well. Computer system 200 may optionally include an auxiliary processor 208, which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Computer system 200 further includes a display system 212 for connecting to a display device 214, and an input/output (I/O) system 216 for connecting to one or more I/O devices 218, 220, up to N number of I/O devices 222. Display system 212 may comprise a video display adapter having all of the components for driving the display device, including video random access memory (VRAM), buffer, and graphics engine as desired. Display device 214 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 216 may comprise one or more controllers or adapters for providing interface functions between one or more of I/O devices 218–222. For example, input/output system 216 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, track pad, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electro-acoustic transducer, microphone, speaker, etc. Input/output system 216 and I/O devices 218–222 may provide or receive analog or digital signals for communication between computer system 200 of the present invention and external devices, networks, or information sources. Input/output system 216 and I/O devices 218–222 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, EEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of computer system 200 of FIG. 1 by one having ordinary skill in the art would not depart from the scope or the spirit of the present invention.

Figure 3:
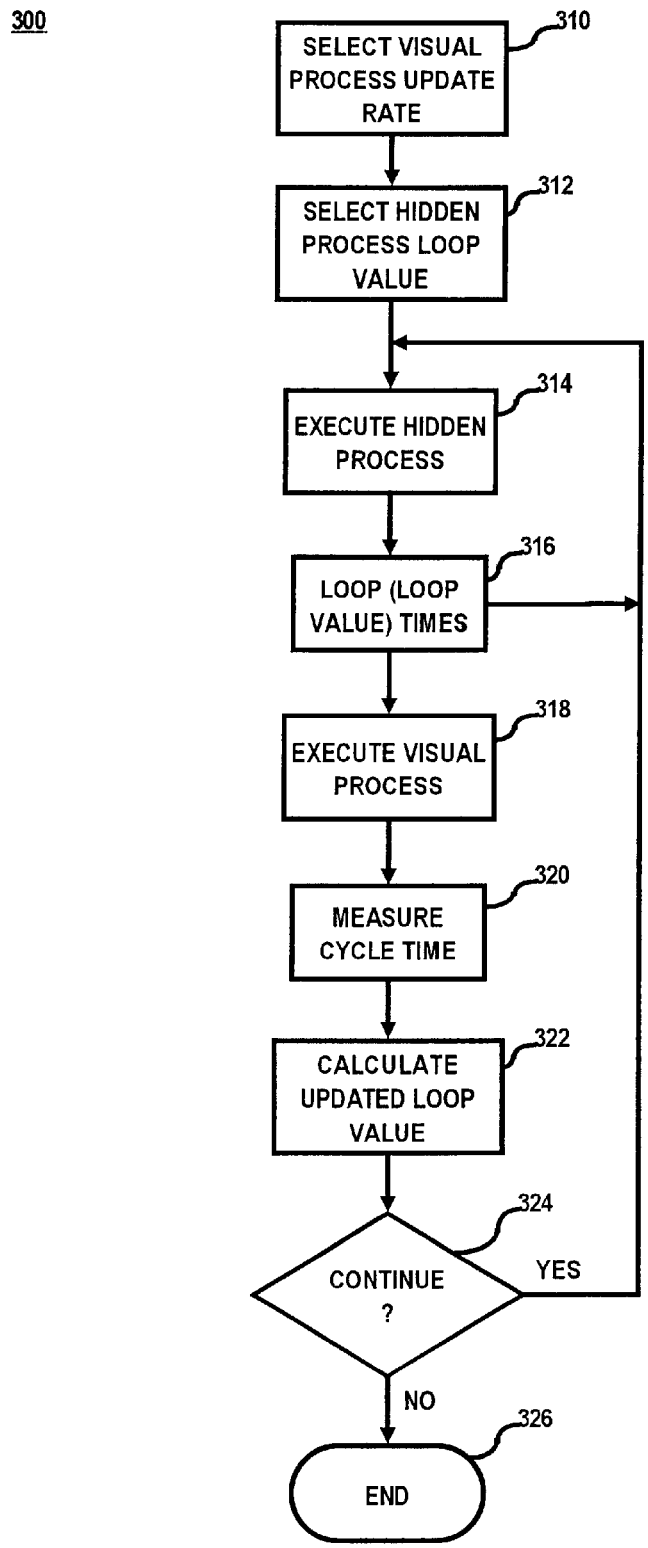
FIG. 3 is a flow diagram of a method for continually updating a process rate in accordance with the present invention.

Referring now to FIG. 3, a method for continually updating a process rate in accordance with the present invention will be discussed. Method 300 is substantially similar to method 100 of FIG. 1, where method 300 continually updates the hidden process loop value with each cycle iteration so that the loop value will converge on a value that causes the visual process update rate in turn to converge to a desired value. IN addition, the hidden loop value may fluctuate with each cycle to maintain an optimum value as processor loading and other events occur that may cause the speed of the computer system to vary from cycle to cycle. The desired visual process update rate is selected at step 310, and a hidden process loop value is selected or determined at step 312. The hidden process is executed at step 314, and reiterated by executing loop step 316 a number of times equal to the hidden process loop value. The visual process is then executed at step 318, and the cycle time is measured at step 320. An updated loop value is calculated at step 322. A determination is made at step 324 whether to continue with the overall process. In the event it is determined to continue with the overall process, subsequent cycles are executed using the updated loop value determined at step 322 for each cycle. Thus, each cycle has the benefit of an updated loop value based upon calculations from the previous cycle. This accounts for cycle-to-cycle variation in computer speed such as due to processor loading with multiple processes or tasks, etc. So long as it is desired to continue with the overall process as determined at step 324, the process continues to be executed by executing steps 314–322. In the event it is determined that the process should not continue, method 300 is terminated at step 326. It should be noted that one having skill in the art, after having the benefit of the present disclosure, would appreciate that methods 100 and 300 need not be limited to the particular order or number of steps as shown and described, and that the order and the number of steps could be altered of modified, including fewer or greater steps, without providing substantial change to the scope of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 204 of one or more computer systems configured generally as described in FIG. 2. Until required by the computer system, the set of instructions may be stored in another computer readable memory such as auxiliary memory 206 of FIG. 2, for example in a hard disk drive or in a removable memory such as an optical disk for utilization in a CD-ROM drive, a floppy disk for utilization in a floppy disk drive, a floppy-optical disk for utilization in a floppy-optical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus for controlling rate of display output for single-threaded processes of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof It is the intention of the following claims to encompass and include such changes.

What is claimed is:

1. A method, comprising:
    executing, during a cycle, a hidden process a number of times equal to an initial loop value, the hidden process gathering and processing data;
    executing a visual process at an end of the cycle, the visual process displaying results of the hidden process;
    measuring the cycle time;
    calculating an updated loop value; and
    executing a subsequent cycle wherein the hidden process is executed a number of times equal to the updated loop value so that the visual process is executed at a desired visual process rate, the method being capable of adapting to different platforms and/or hardware configurations so as to be executed at an optimal, controlled, and normalized rate.

2. A method as claimed in claim 1, wherein the updated loop value is calculated by dividing the initial loop value by the product of the cycle time and the desired visual process rate.

3. A method as claimed in claim 1, further comprising the step of selecting a predetermined initial loop value.

4. A method as claimed in claim 1, further comprising the step of selecting a predetermined initial visual process rate.

5. A method as claimed in claim 1, further comprising the step of continually executing said calculating step for each cycle.

6. A method as claimed in claim 1, further comprising the step of using in a subsequent cycle an updated loop value as calculated by said calculating step from a previous cycle.

7. A set of instructions impressible upon a medium capable of being read by a machine, the set of instructions for causing a machine to implement steps for normalizing a process rate according to the set of instructions, the steps comprising:
    executing, during a cycle, a hidden process a number of times equal to an initial loop value, the hidden process gathering and processing data;
    executing a visual process at an end of the cycle, the visual process displaying results of the hidden process;
    measuring the cycle time;
    calculating an updated loop value; and
    executing a subsequent cycle wherein the hidden process is executed a number of times equal to the updated loop value so that the visual process is executed at a desired visual process rate, the method being capable of adapting to different platforms and/or hardware configurations so as to be executed at an optimal, controlled, and normalized rate.

8. A set of instructions as claimed in claim 7, wherein the updated loop value is calculated by dividing the initial loop value by the product of the cycle time and the desired visual process rate.

9. A set of instructions as claimed in claim 7, the steps further comprising the step of selecting a predetermined initial loop value.

10. A set of instructions as claimed in claim 7, the steps further comprising the step of selecting a predetermined initial visual process rate.

11. A set of instructions as claimed in claim 7, the steps further comprising the step of continually executing said calculating step for each cycle.

12. A set of instructions as claimed in claim 7, the steps further comprising the step of using in a subsequent cycle an updated loop value as calculated by said calculating step from a previous cycle.

13. An apparatus, comprising:
    means for executing, during a cycle, a hidden process a number of times equal to an initial loop value, the hidden process gathering and processing data;
    means for executing a visual process at an end of the cycle, the visual process displaying results of the hidden process;

means for measuring the cycle time;

means for calculating an updated loop value; and means for executing a subsequent cycle wherein the hidden process is executed a number of times equal to the updated loop value so that the visual process is executed at a desired visual process rate, the method being capable of adapting to different platforms and/or hardware configurations so as to be executed at an optimal, controlled, and normalized rate.

14. An apparatus as claimed in claim 13, wherein said calculating means calculates the updated loop value by dividing the initial loop value by the product of the cycle time as measured by said measuring means and the desired visual process rate.

15. An apparatus as claimed in claim 13, further comprising means for selecting a predetermined initial loop value.

16. An apparatus as claimed in claim 13, further comprising means for selecting a predetermined initial visual process rate.

17. An apparatus as claimed in claim 13, said calculating means continually calculating an updated loop value for each cycle.

18. An apparatus as claimed in claim 13, wherein an the updated loop value is used in a subsequent cycle as calculated by said calculating means in a previous cycle.

19. A method as claimed in claim 1, wherein the update loop value is capable of fluctuating with each cycle to maintain an optimum value as events cause the speed of a computer system to vary from cycle to cycle.

20. A method as claimed in claim 19, wherein the updated loop value converges on a value that causes the visual process rate to converge to a desired value.

21. A set of instructions as claimed in claim 7, wherein the update loop value is capable of fluctuating with each cycle to maintain an optimum value as events cause the speed of a computer system to vary from cycle to cycle.

22. A set of instructions as claimed in claim 21, wherein the updated loop value converges on a value that causes the visual process rate to converge to a desired value.

23. An apparatus as claimed in claim 13, wherein the update loop value is capable of fluctuating with each cycle to maintain an optimum value as events cause the speed of a computer system to vary from cycle to cycle.

24. An apparatus as claimed in claim 23, wherein the updated loop value converges on a value that causes the visual process rate to converge to a desired value.

* * * * *